United States Patent
Abraham et al.

(10) Patent No.: US 12,522,268 B2
(45) Date of Patent: Jan. 13, 2026

(54) TRANSPORT DOLLY INCORPORATING A CAROUSEL

(71) Applicant: Toyota Motor Engineering & Manufacturing North America, Inc., Plano, TX (US)

(72) Inventors: James Joseph Alan Abraham, Brantford (CA); Jeff Wayne McLachlin, Woodstock (CA)

(73) Assignees: Toyota Motor Engineering & Manufacturing North America, Inc., Plano, TX (US); Toyota Jidosha Kabushiki Kaisha, Toyota (JP)

(*) Notice: Subject to any disclaimer, the term of this patent is extended or adjusted under 35 U.S.C. 154(b) by 331 days.

(21) Appl. No.: 18/333,910

(22) Filed: Jun. 13, 2023

(65) Prior Publication Data
US 2024/0416985 A1  Dec. 19, 2024

(51) Int. Cl.
*B62B 3/00* (2006.01)
*B62B 3/04* (2006.01)
*B65D 19/08* (2006.01)

(52) U.S. Cl.
CPC ............... *B62B 3/04* (2013.01); *B62B 3/005* (2013.01); *B65D 19/08* (2013.01)

(58) Field of Classification Search
CPC ........... B62B 3/04; B62B 3/005; B62B 3/003; B62B 3/004; B62B 3/025;
(Continued)

(56) References Cited

U.S. PATENT DOCUMENTS

| 1,407,624 A | * | 2/1922 | Bailey | E06B 9/66 160/278 |
| 3,830,385 A | * | 8/1974 | Young | B62D 13/04 414/536 |

(Continued)

FOREIGN PATENT DOCUMENTS

| DE | 102008056591 A1 | * | 5/2010 | ............. B62B 5/049 |
| DE | 102012022805 B3 | * | 2/2014 | ............. B65D 19/08 |

(Continued)

OTHER PUBLICATIONS

Akro-Mils, "Storage-Go-Round for Steel 19-Series Cabinets", Retrieved from the Internet: <https://akro-mils.com/Products/Types/Cabinets-Racks-Shelving-Panels/Metal-Storage-Cabinets/98325>, retrieved Jun. 9, 2023 (2 pages).

(Continued)

*Primary Examiner* — Steve Clemmons
(74) *Attorney, Agent, or Firm* — Christopher G. Darrow; Darrow Mustafa PC

(57) ABSTRACT

A dolly structured for transport of component parts bins to and from plant floor work sites includes a base and a carousel rotatably connected to the base. The carousel has a pair of opposed open sides, with each side structured to enable an entire array or arrangement of component parts bins to be loaded or unloaded onto the carousel at the same time. The dolly also incorporates a first locking mechanism structured to lock the carousel in any of four orientations spaced apart at intervals of 90° during rotation of the carousel. The arrangement described provides flexibility in loading and unloading the carousel with parts bins, decreases the total amount of space needed to load and unload the dolly, and the amount of space needed to maneuver the dolly into a position and orientation that is usable by a worker on the assembly line, and improves user safety.

8 Claims, 8 Drawing Sheets

(58) Field of Classification Search
CPC ......... B62B 2203/071; B62B 2203/70; B62B 2205/20; B65D 2519/00875; B65D 90/021; B65D 88/005; B65D 88/127; B65D 19/08; A47B 49/00; E06B 9/78; E06B 9/56; E06B 9/66; E06B 9/0692
See application file for complete search history.

(56) References Cited

U.S. PATENT DOCUMENTS

| | | | | |
|---|---|---|---|---|
| 4,229,060 | A * | 10/1980 | Brownlee | A47B 63/062 108/142 |
| 5,024,175 | A * | 6/1991 | Epstein | A41H 43/02 108/103 |
| 5,286,103 | A * | 2/1994 | Price, Jr. | A47B 81/068 211/163 |
| 6,502,619 | B1 * | 1/2003 | Kraeutler | E06B 9/0653 160/84.01 |
| 7,416,196 | B2 * | 8/2008 | Brown | B62B 3/04 108/142 |
| 8,393,847 | B1 * | 3/2013 | Mecklenburg | B60P 1/5433 108/142 |
| 8,882,076 | B2 * | 11/2014 | Scelfo | B65D 19/38 414/781 |
| 2003/0089461 | A1 * | 5/2003 | Dondlinger | E06B 9/86 160/84.06 |
| 2005/0079039 | A1 * | 4/2005 | Neumann | B62B 3/04 414/529 |
| 2008/0047917 | A1 * | 2/2008 | Hernandez | B65D 90/0073 211/180 |
| 2009/0308866 | A1 * | 12/2009 | Elvin-Jensen | B65D 11/26 220/6 |
| 2012/0068395 | A1 * | 3/2012 | Daeschner | B25H 1/08 29/559 |
| 2015/0008660 | A1 * | 1/2015 | Griffard | B62B 3/025 280/651 |
| 2015/0014264 | A1 * | 1/2015 | Linnell, Sr. | B62B 3/005 108/147.11 |
| 2017/0282949 | A1 * | 10/2017 | Gonzalez | B62B 3/005 |

FOREIGN PATENT DOCUMENTS

| | | | | |
|---|---|---|---|---|
| EP | 2687429 A2 * | 1/2014 | | B60D 1/143 |
| WO | WO-2022038569 A1 * | 2/2022 | | B65D 90/0073 |

OTHER PUBLICATIONS

CSI, "Turntable Assembly—700MM(W) X 700MM(D) C/W Bin Cabinets", Retrieved from the Internet: <https://www.csi-products.co.uk/storage-and-shelving/small-parts-storage-and-picking/bin-and-drawer-cabinets/turntable-assembly-700mmw-x-700mmd-c-w-bin-cabinets?cclcl=en_GB>, retrieved Jun. 9, 2023 (4 pages).

Motamec, "Motamec Rotating Tower Tilt Bin Parts Storage Compartment Bins—36 Drawers ", Retrieved from the Internet: <https://www.ebay.co.uk/itm/Motamec-Rotating-Tower-Tilt-Bin-Parts-Storage-Compartment-Bins-36-Drawers/383747580769>, retrieved Jun. 9, 2023 (5 pages).

Prairie Steel, "Flat Bottom Bins", Retrieved from the Internet: <http://prairiesteel.com/flat-bottom-bins/>, retrieved Jun. 9, 2023 (5 pages).

CSI, Small Parts Drawer Cabinet with Doors—48 Drawers:, Retrieved from the Internet: <https://www.csi-products.co.uk/storage-and-shelving/small-parts-storage-and-picking/bin-and-drawer-cabinets/small-parts-drawer-cabinet-with-doors-48-drawers?cclcl=en_GB>, retrieved Jun. 9, 2023 (4 pages).

* cited by examiner

TRANSPORT DOLLY INCORPORATING A CAROUSEL

TECHNICAL FIELD

The present invention relates to transport dollies for transporting parts bins and assembly components to various locations in a manufacturing environment.

BACKGROUND

Dollies are used to transport assembly components and parts bins to workstations in manufacturing environments. A dolly may remain at a workstation until the parts loaded on the dolly are used up by a worker at the workstation. To make full use of space available on the dolly and to accelerate the dolly loading process, parts bins may be loaded onto opposite or adjacent sides of the dolly. When the dolly is moved to a workstation, all of the parts loaded onto the dolly may not be accessible by a worker from a single side of the dolly. To access parts available from a side of the dolly facing away from the worker, the worker must move to that side of the dolly. This adds to the time required for assembly operations and may increase the likelihood of injury to the worker, because the worker may be required to move to a side of the dolly residing adjacent plant traffic flow.

SUMMARY

In one aspect of the embodiments described herein, a dolly includes a base and a carousel rotatably connected to the base. The dolly may include a first locking mechanism structured to automatically configure to a locked condition responsive to rotation of the carousel to any of a plurality of predetermined rotational orientations, and structured to be manually configurable to an unlocked condition. The dolly may also include a second-locking mechanism rotatably coupled to the base and structured to be manually rotatable between a locked condition preventing rotation of the carousel with respect to the base, and an unlocked condition enabling rotation of the carousel with respect to the base.

DETAILED DESCRIPTION

Figure 1:
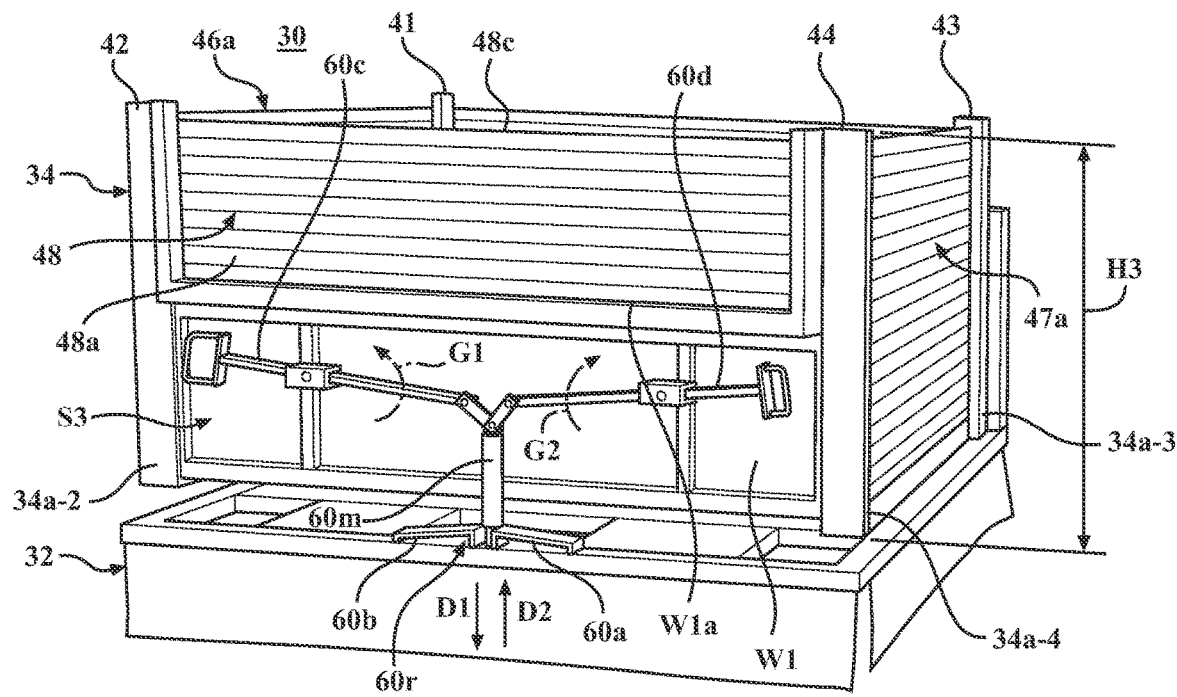
FIG. 1 is a schematic perspective view of a dolly in accordance with an embodiment described herein.

Embodiments described herein relate to a dolly structured for transport of component parts bins to and from plant floor work sites. The dolly may also be structured for storage of the parts bins at a work site, in a manner facilitating convenient and safe access to component parts stored in the bins. The dolly may include a base and a carousel rotatably connected to the base. The carousel may have a pair of opposed open sides, with each side structured to enable an entire array or arrangement of component parts bins to be loaded or unloaded onto the carousel at the same time. The dolly also incorporates a first locking mechanism structured to lock the carousel in any of four orientations spaced apart at intervals of 90° during rotation of the carousel. This enables a user positioned along any of three sides of the dolly to access parts from either array of parts bins by rotating the carousel to an appropriate orientation and locking it in the orientation. This arrangement provides flexibility in loading and unloading the carousel with parts bins. The arrangement also decreases the total amount of space needed to load and unload the dolly, and the amount of space needed to maneuver the dolly into a position and orientation that is usable by a worker on the assembly line. The arrangement also improves user safety, by obviating the need for a user to move to a side of the dolly residing adjacent the plant traffic flow in order access needed component parts.

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details. Unless otherwise noted, similar reference characters are used to describe similar features on separate elements and/or embodiments.

Figure 1A:
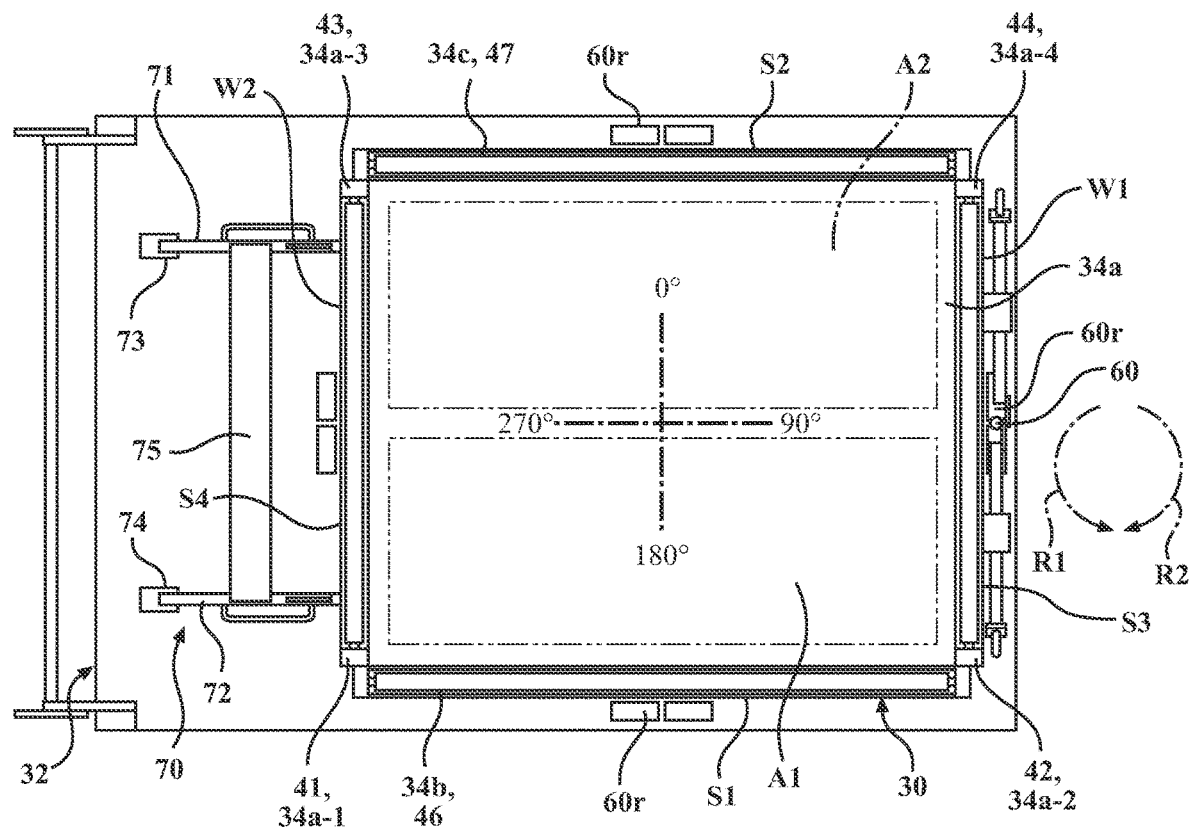
FIG. 1A is a schematic plan view of the dolly shown in FIG. 1.

FIG. 1 is a schematic perspective view of a dolly 30 in accordance with an embodiment described herein. FIG. 1A is a schematic plan view of the dolly shown in FIG. 1. The dolly 30 may be structured for transport of component parts bins to and from plant floor work sites. The dolly 30 may also be structured for storage of the parts bins at a work site, in a manner facilitating convenient and safe access to component parts stored in the bins.

In one or more arrangements, the dolly 30 may include a base 32 and a carousel 34 rotatably connected to the base 32. "Rotatably connected" means that the carousel 34 is connected to the base 32 so as to be rotatable with respect to the base. A plurality of wheels or rollers (not shown) may be mounted in a known manner along an underside of the base 32 to enable the base to be wheeled along a ground surface. As shown in FIG. 1A, the base 32 may be generally rectangular in plan view. In one or more arrangements, one side of the base may include a handle 99 and associated support structure to facilitate manual movement of the dolly 30 along a floor surface.

For purposes described herein, a "carousel" may be defined as a rotatable case or platform used for storage, display, and/or other purposes. Referring to the drawings, the carousel 34 may have four sides S1, S2, S3, S4. The carousel 34 may include a floor 34a. The floor 34a may be square-shaped in plan view. The carousel floor 34a may be supported by the base 32 (for example, using ball bearings) for 360° rotation with respect to the base 32. The dolly 30 may be structured so that the carousel 34 is rotatable 360° in either of directions R1 and R2 (FIG. 1A) with respect to the base 32. Referring to FIG. 1A, the floor 34a may be structured to support back-to-back arrays A1, A2 of stacked component parts bins thereon, both for transport and for use by assembly-line workers when the dolly 30 is parked adjacent a plant work site.

The carousel 34 may also include four corner posts 41, 42, 43, 44 extending perpendicularly with respect to the floor 34a, with a corner post extending from a respective one of each of corners 34a-1, 34a-2, 34a-3, 34a-4 of the square-shaped floor.

Figure 3:
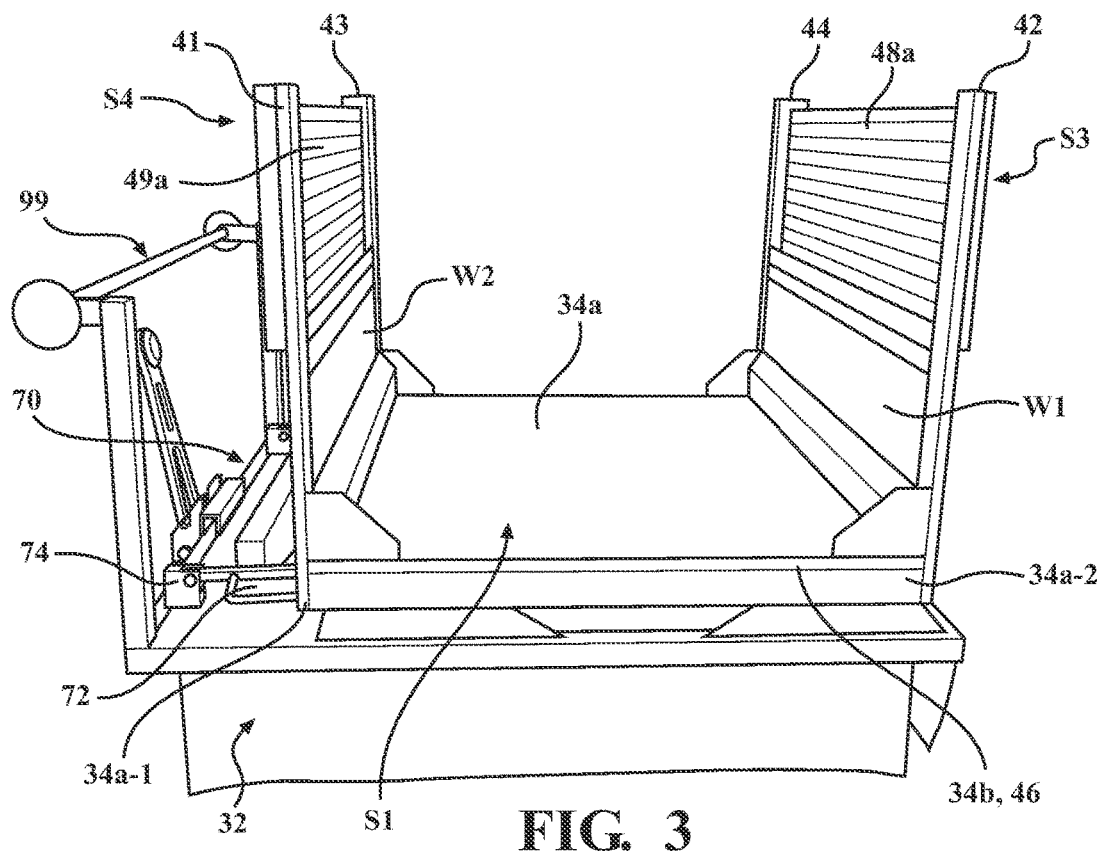
FIG. 3 is a schematic side perspective view of the dolly of FIG. 1 showing the dolly carousel locked in a lockable rotational orientation with curtain assemblies along opposite sides of the carousel in stowed or lowered conditions.
Figure 4:
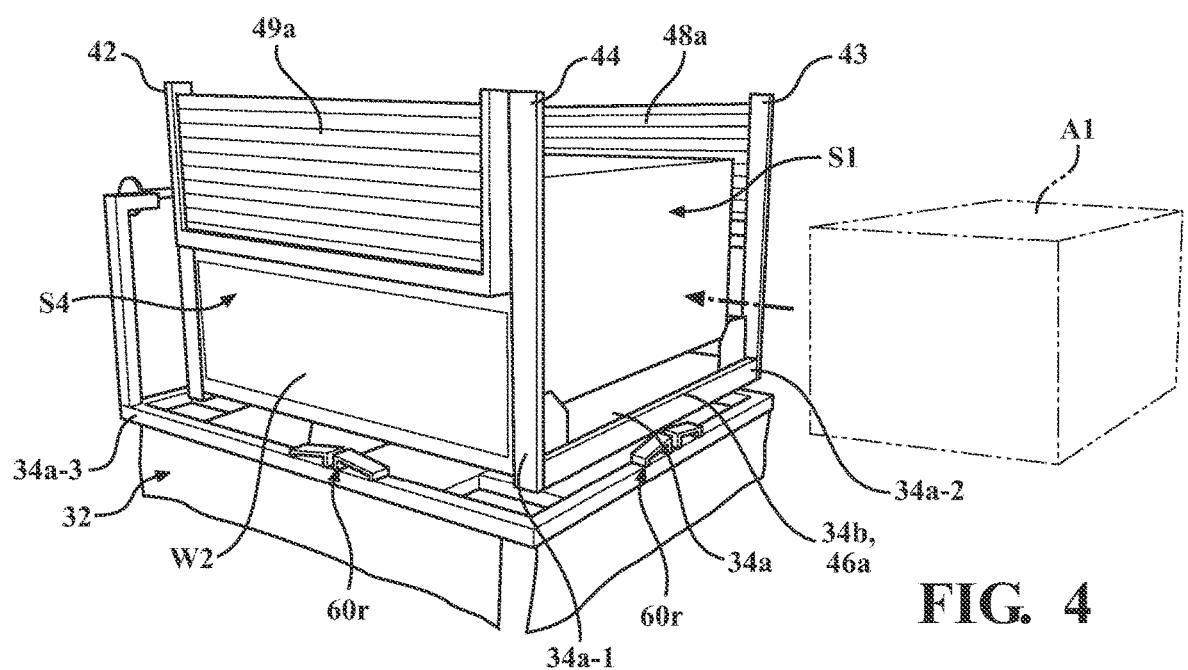
FIG. 4 is a perspective view of the dolly of FIG. 1, illustrating loading of an array of parts bins onto the dolly carousel along a side of the carousel.
Figure 7:
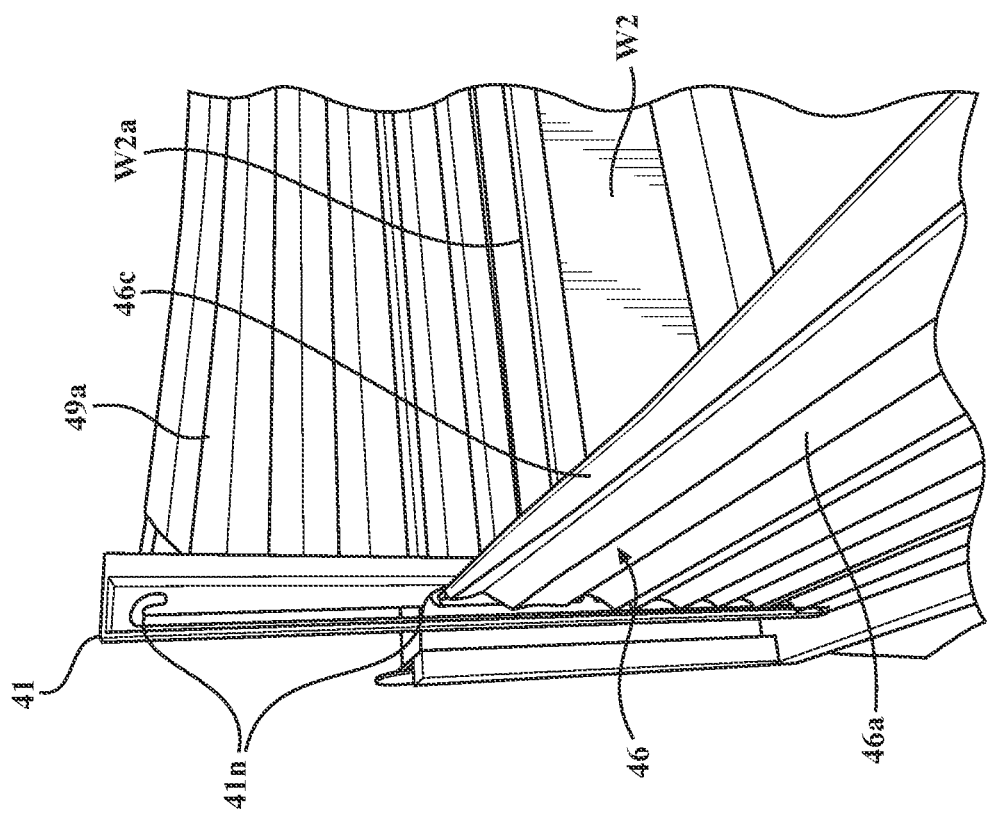
FIG. 7 is the schematic partial perspective view of FIG. 6, showing a curtain assembly retained in a partially deployed condition along the side of the carousel by engagement between the curtain assembly and the notches.
Figure 7A:
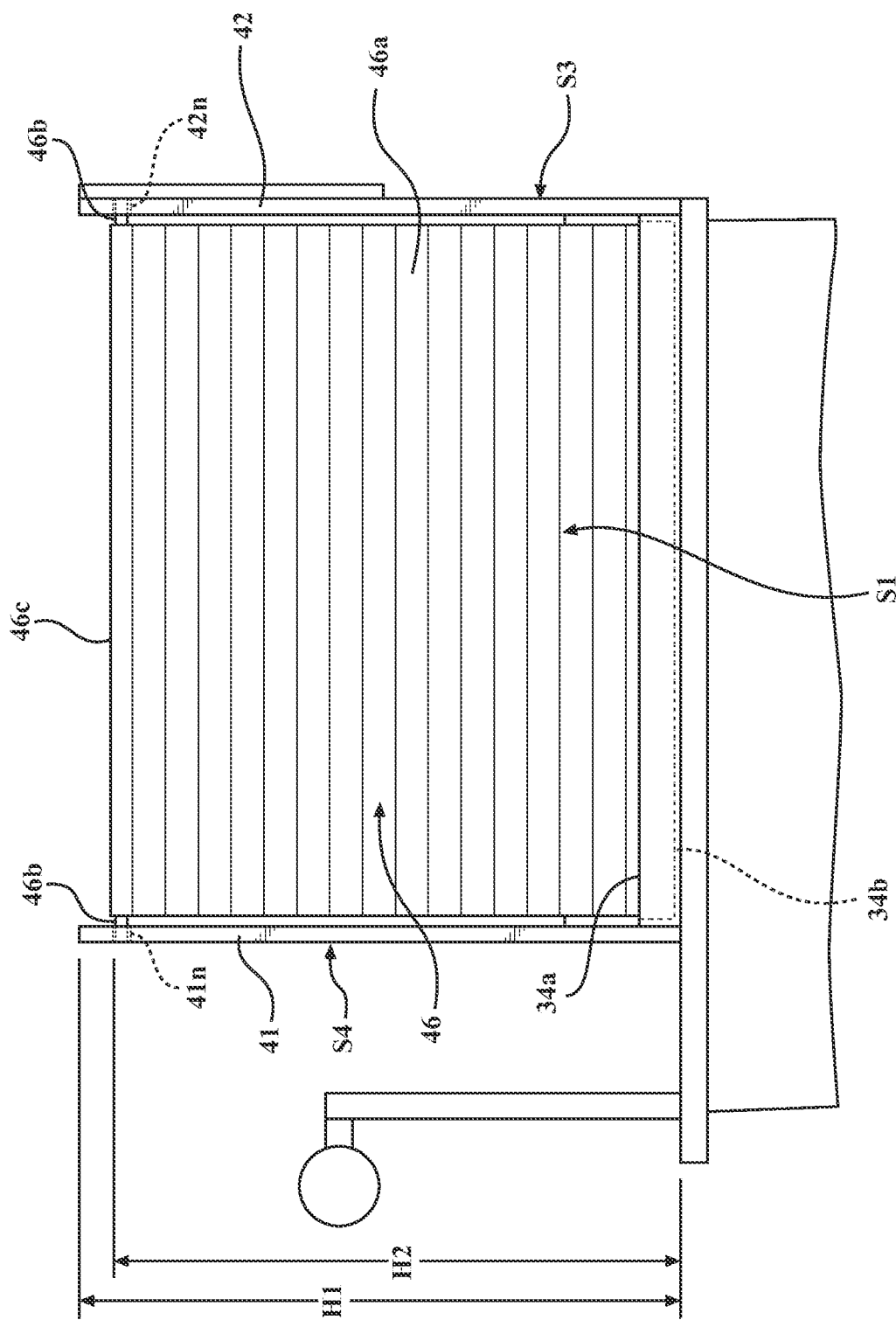
FIG. 7A is a schematic side view of the dolly shown in FIG. 7, showing the curtain assembly retained in a fully deployed condition by engagement of retaining members of the curtain assembly with notches formed along respective corner posts.

Referring to FIGS. 1A, 3, and 7A, the carousel 34 may also include a first cavity 34b formed in the floor 34a along a first side S1 of the carousel. A first collapsible curtain assembly 46 may be received in the floor first cavity 34b. Curtain assembly 46 may include a collapsible curtain 46a and a curtain retaining member 46b (FIG. 7A) extending from each of a first and a second opposed ends of an edge 46c of the curtain 46a. In particular arrangements, the collapsible curtain 46a may have an accordion-type structure designed to be vertically collapsible into the first cavity 34b under the force of its own weight when not secured to the corner posts 41, 42, 43, 44 or otherwise supported.

Figure 2:
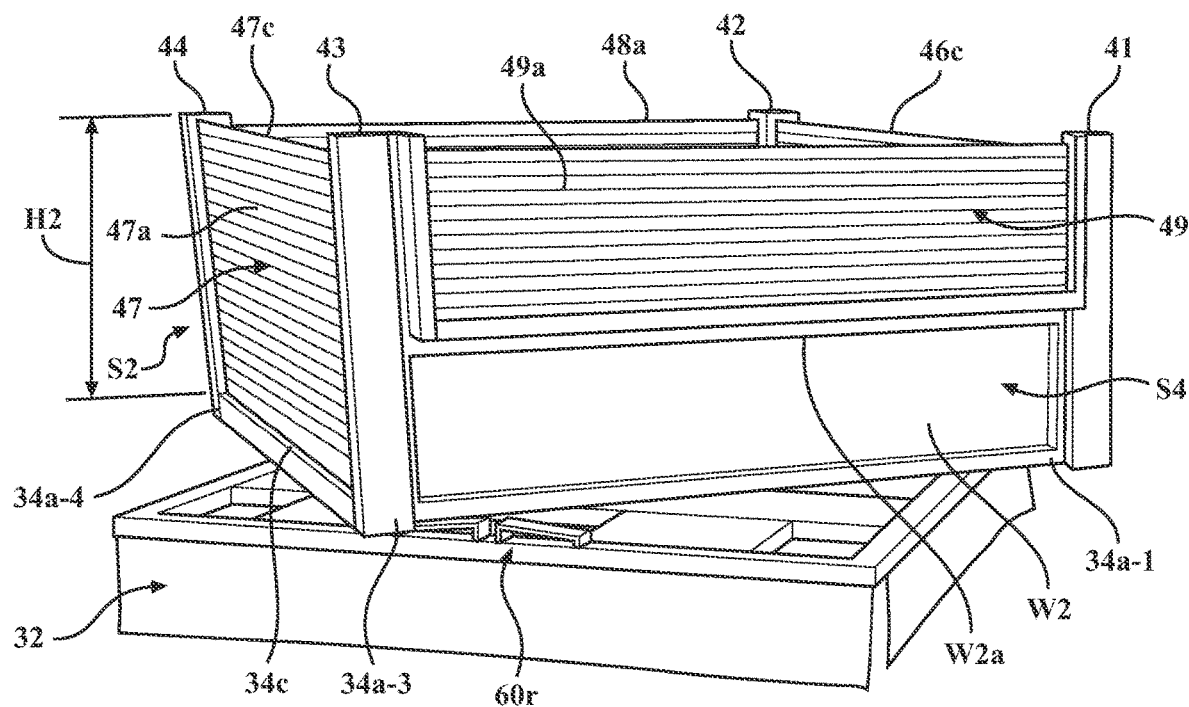
FIG. 2 is the schematic perspective view of FIG. 1, showing the dolly carousel partially rotated between successive rotational orientations in which the carousel may be locked for use by a worker, and showing all curtain assemblies of the carousel in deployed or raised conditions along respective sides of the carousel.

Referring to FIGS. 1A and 2, the carousel 34 may also include a second cavity 34c formed in the floor 34a along a second side S2 of the carousel opposite the first side S1. A second collapsible curtain assembly 47 similar to the first collapsible curtain assembly 46 may be received in the floor second cavity 34c. Curtain assembly 47 may include a collapsible curtain 47a and a curtain retaining member (not shown) extending from each of a first and a second opposed ends of an edge 47c of the curtain 47a. Each of the first and second collapsible curtain assemblies 46, 47 may be manually configurable to any of a stowed condition and a deployed condition. In the stowed condition, a curtain assembly may be received in an associated one of first or second cavities 34b, 34c such that the entire curtain assembly resides in the cavity below a level of the floor 34a. This may facilitate loading of component parts bins onto the floor 34a without interference and may also prevent damage to the curtain assembly from parts bin loading. Referring to FIGS. 2 and 7A, in the deployed condition of one of curtain assemblies 46, 47, the curtain may extend from the associated cavity to a selected height H2 above the floor 34a, to cover a portion of an associated side of the carousel 34 to prevent parts bins located on the floor from falling off of the carousel during movement of the dolly 30.

Figure 6:
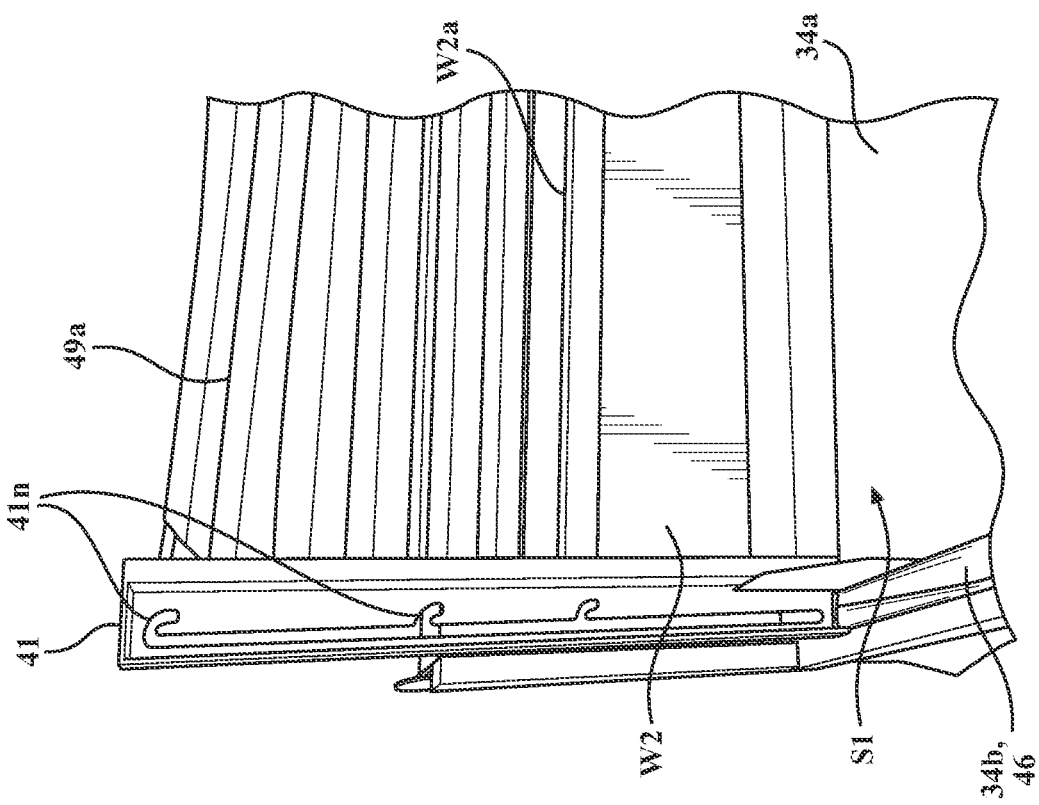
FIG. 6 is a schematic partial perspective view of a side of the carousel of FIG. 1, with a curtain assembly in a stowed condition along the side and showing notches formed in a corner post of the carousel for retaining the curtain assembly in a deployed condition.

Referring to FIGS. 6, 7, and 7A, each of corner posts 40, 41, 42, and 43 may have a plurality of notches formed therealong. Post 41 may have notches 41n, post 42 may have notches 42n (not shown), post 43 may have notches 43n (not shown), and post 44 may have notches 44n (not shown). In the deployed condition of a curtain assembly, each curtain retaining member may be received in an associated notch formed in one of the corner posts 41, 42, 43, 44 at the selected height H2 above the floor 34a. For example, referring to FIGS. 1A and 7A, along a first side S1 of the carousel 34, first corner post 41 may include a notch 41n formed therealong, and second corner post 42 spaced apart from the first corner post 41 may also include a notch 42n formed therealong. Each of the first corner post notch 41n and the second corner post notch 42n may be structured to receive therein a portion of an associated curtain retaining member 46b extending from the curtain assembly 46, to maintain the curtain assembly 46 in the deployed condition.

In the example, shown, the first corner post notch 41n and the second corner post notch 42n may have the same vertical heights H2 above the floor 34a. In addition, referring to FIGS. 6, 7, and 7A, multiple pairs of notches (similar to the pair including the first corner post notch 41n and the second corner post notch 42n) may be formed along the first and second corner posts 41, 42, with each pair of notches positioned at a different vertical height above the floor. This arrangement may provide a user with several different options for the height at which to secure the edge 46c of the curtain 46a when in the deployed condition, according to the height of an array of parts bins stacked on the carousel floor 34a.

Similarly, along the second side S2 of the carousel 34 opposite first side S1, a third corner post 43 may include a notch (not shown) formed therealong, and a fourth corner post 44 spaced apart from the third corner post 43 may also include a notch (not shown) formed therealong. Each of the third corner post notch and the fourth corner post notch may be structured to receive therein a portion of an associated curtain retaining member extending from the curtain assembly 47, to maintain the curtain assembly 47 in a deployed condition similar to the deployed condition of curtain assembly 46 shown in FIGS. 1, 2, and 7A. Also in a manner similar to that described for curtain assembly 46, the third corner post notch and the fourth corner post notch may have the same vertical heights H2 above the floor as the previously described notches 41n and 42n. In addition, multiple pairs of notches (similar to the pair including the third corner post notch and the fourth corner post notch) may be formed along the third and fourth corner posts 43, 44, with each pair of notches positioned at a different vertical height above the floor. This arrangement may provide a user with several different options for the height at which to secure the edge 47c of the curtain 47a when in the deployed condition, according to the height of an array of parts bins stacked on the carousel floor 34a.

Referring to FIGS. 1A and 7A, in three dimensions, including the floor 34a and the corner posts 41, 42, 43, 44 extending upwardly from the floor 34a, the outer boundaries of the carousel space envelope may define an overall cubic shape or the shape of a rectangular prism, depending on the height H1 of the carousel as determined by the corner posts 41, 42, 43, 44.

Referring to FIGS. 1, 1A, and 3, along a third side S3 of the carousel 34 extending between the first side S1 and the second side S2, a first wall W1 may extend a predetermined distance from the floor 34a between the second corner post 42 and the fourth corner post 44 and perpendicularly with respect to the floor 34a. Another collapsible curtain assembly 48 similar to the first and second collapsible curtain assemblies 46, 47 may be supported by an upper edge W1a of the first wall. Similar to the curtain assemblies previously described, the curtain assembly 48 may include a collapsible curtain 48a and a curtain retaining member (not shown) extending from each of a first and a second opposed ends of an edge 48c of the curtain 48a.

The collapsible curtain assembly 48 may be manually configurable to any of a stowed condition and a deployed condition. In the stowed condition, the curtain 48a is folded and supported by the upper edge W1a of the wall W1. In the deployed condition of the curtain assembly 48, the curtain extends 48a between the corner posts 42 and 44 from the upper edge W1a of the first wall W1 to a selected height H3 above the floor 34a, to cover a portion of the third side S3 of the carousel 34 to prevent stacked parts bins located on the floor 34a from falling off of the carousel 34 during movement of the dolly 30. In the deployed condition of the curtain assembly 48, each curtain retaining member of the curtain assembly 48 may be received in an associated notch (not shown) formed in a respective one of one of the corner posts 42, 44 at the selected height H3 above the floor 34a, as previously described with regard to curtain assemblies 46 and 47.

In addition, the corner post 42 may include a notch (not shown) formed therealong, and the corner post 44 may also include a notch (not shown) formed therealong, as previously described. Each of the corner post 42 notch and the corner post 44 notch may be structured to receive therein a portion of an associated curtain retaining member (not shown) extending from the curtain 48a, to maintain the curtain assembly 48 in the deployed condition. In particular arrangements, the corner post 42 notch and the corner post 44 notch may have the same vertical heights H3 above the floor. In addition, multiple pairs of notches (similar to the pair including the first corner post notch 41n and the second corner post notch 42n of FIG. 2) may be formed along the first corner post 41 and the third corner post 43, with each pair of notches positioned at a different vertical height above the floor. This arrangement may provide a user with several different options for the height at which to secure the edge of the curtain 48a when in the deployed condition, according to the height of an array of parts bins stacked on the carousel floor 34a.

Referring to FIGS. 1A, 2, and 3, along a fourth side S4 of the carousel 34 extending between the first and second sides S1, S2, a second wall W2 may extend a predetermined distance from the floor 34a between the first corner post 41 and the third corner post 43 and perpendicularly with respect to the floor 34a. Yet another, fourth collapsible curtain assembly 49 similar to the collapsible curtain assembly 48 may be supported by an upper edge W2a of the second wall W2. Similar to the curtain assemblies previously described, the curtain assembly 49 may include a collapsible curtain 49a and a curtain retaining member 49b extending from each of a first and a second opposed ends of an edge 49c of the curtain assembly 49.

The fourth collapsible curtain assembly 49 may be manually configurable to any of a stowed condition and a deployed condition. In the stowed condition, a curtain assembly 49 is folded and supported by the upper edge W2a of the second wall W2. In the deployed condition of the curtain assembly 49, the curtain 49a extends between the first corner post 41 and the third corner post 43 from the upper edge W2a of the second wall W2 to a selected height H3 above the floor 34a, to cover a portion of the fourth side S4 of the carousel 34 to prevent parts bins located on the floor 34a from falling off of the carousel 34 during movement of the dolly 30. In the deployed condition of the curtain assembly 49, each curtain retaining member may be received in an associated notch formed in one of the corner posts 41, 43 at the selected height H3 above the floor, as previously described with regard to curtain assembly 48.

In addition, the first corner post 41 may include a notch formed therealong (not shown) and the third corner post 43 may also include a notch (not shown) formed therealong as previously described. Each of the first corner post notch and the third corner post notch may be structured to receive therein a portion of an associated curtain retaining member extending from an edge 49c the curtain 49a, to maintain the curtain assembly 49 in the deployed condition. In particular arrangements, the first corner post notch and the third corner post notch may have the same vertical heights H3 above the floor. In addition, multiple pairs of notches (similar to the pair including the first corner post notch 41n and the second corner post notch 42n of FIG. 7A) may be formed along the first and third corner posts 41, 43, with each pair of notches positioned at a different vertical height above the floor. This arrangement may provide a user with several different options for the height at which to secure the edge 49c of the curtain 49a when in the deployed condition, according to the height of an array of parts bins stacked on the carousel floor 34a. In particular arrangements, the height H3 may be equal to the height H2 so that a barrier of a constant height is formed enclosing the parts bins positioned on the floor 34a.

The dolly 30 may also be structured so that the carousel 34 is lockable in any one of a plurality of predetermined rotational orientations. In particular arrangements, the carousel 34 may be lockable in predetermined rotational orientations located at 90° increments as described herein. FIGS. 1, 1A, 8, and 9 show an embodiment of a first locking mechanism (generally designated 60) structured to lock carousel 34 in predetermined rotational orientations located at 90° increments.

In embodiments described herein, the first locking mechanism 60 may be mounted on the third side S3 of the carousel 34, along the first wall W1. In one or more arrangements, the first locking mechanism 60 may be structured to automatically configure to a locked condition responsive to rotation of the carousel 34 to any of a plurality of predetermined rotational orientations, and structured to be manually configurable to an unlocked condition.

As used herein, the term "configure" may refer to arranging a group of operably connected elements so as to achieve a particular effect (in this case, either preventing rotation of the carousel 34 with respect to the base 32 ("locked condition") or enabling rotation of the carousel 34 with respect to the base ("unlocked condition"). A "locked condition" of the first locking mechanism 60 is a condition where the mechanism has been actuated so as to insert a locking member 60m of the mechanism to an opening in a locking member receptacle 60r of the mechanism 60 so as to prevent rotation of a carousel 34 to which the locking member 60m is attached, with respect to the base 32. An "unlocked condition" of the first locking mechanism 60 is a condition where the mechanism has been actuated so as to withdraw the locking member 60m from the receptacle opening so as to enable rotation of the carousel 34 with respect to the base 32.

Referring to FIGS. 1, 1A, 8, and 9, the first locking mechanism 60 may include locking member 60m. The locking member 60m may be mounted on the carousel 34 so as to be vertically movable responsive to manual actuation of the first locking mechanism 60 as described herein, and also responsive to contact between the locking member 60m and various ramps 60a, 60b of the locking member receptacle 60r attached to the base 32 as described herein.

The first locking mechanism 60 may include a locking member receptacle 60r mounted on the dolly base 32. In the embodiment shown, a locking member receptacle 60r is mounted on each of sides S1, S2, S3, S4 of the dolly base at locations angularly spaced apart spaced 90° so that the first locking mechanism locking member 60m can engage a receptacle every 90° to lock the carousel 34 in an associated predetermined rotational orientation. FIG. 1A shows receptacles 60r mounted on the base at 90° intervals outside the edges of the floor 34a.

Figure 8:
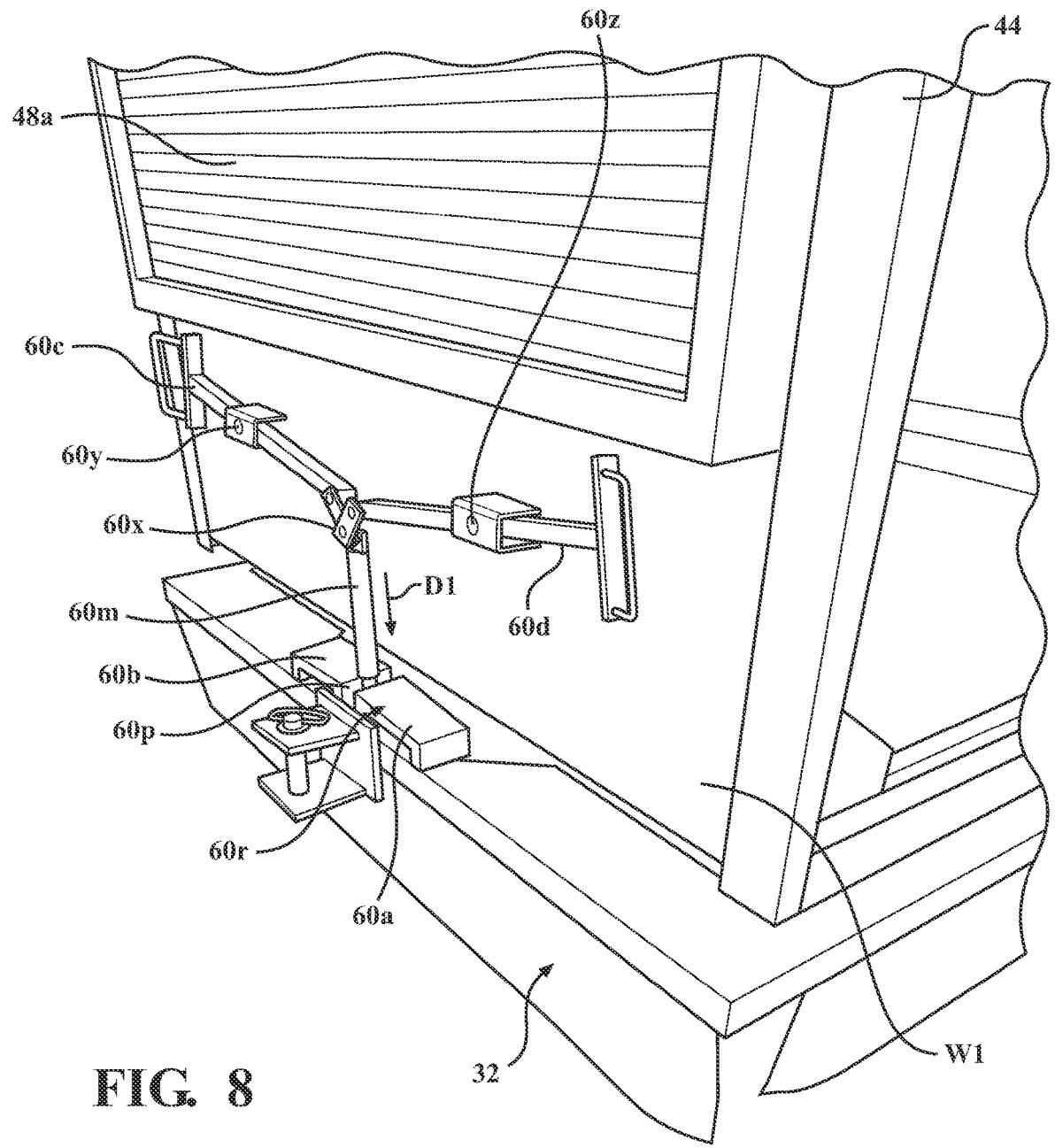
FIG. 8 is a schematic partial perspective view of the carousel of FIG. 1, showing a locking mechanism mounted along a side of the carousel and configured to a locked condition preventing rotation of the carousel.
Figure 9:
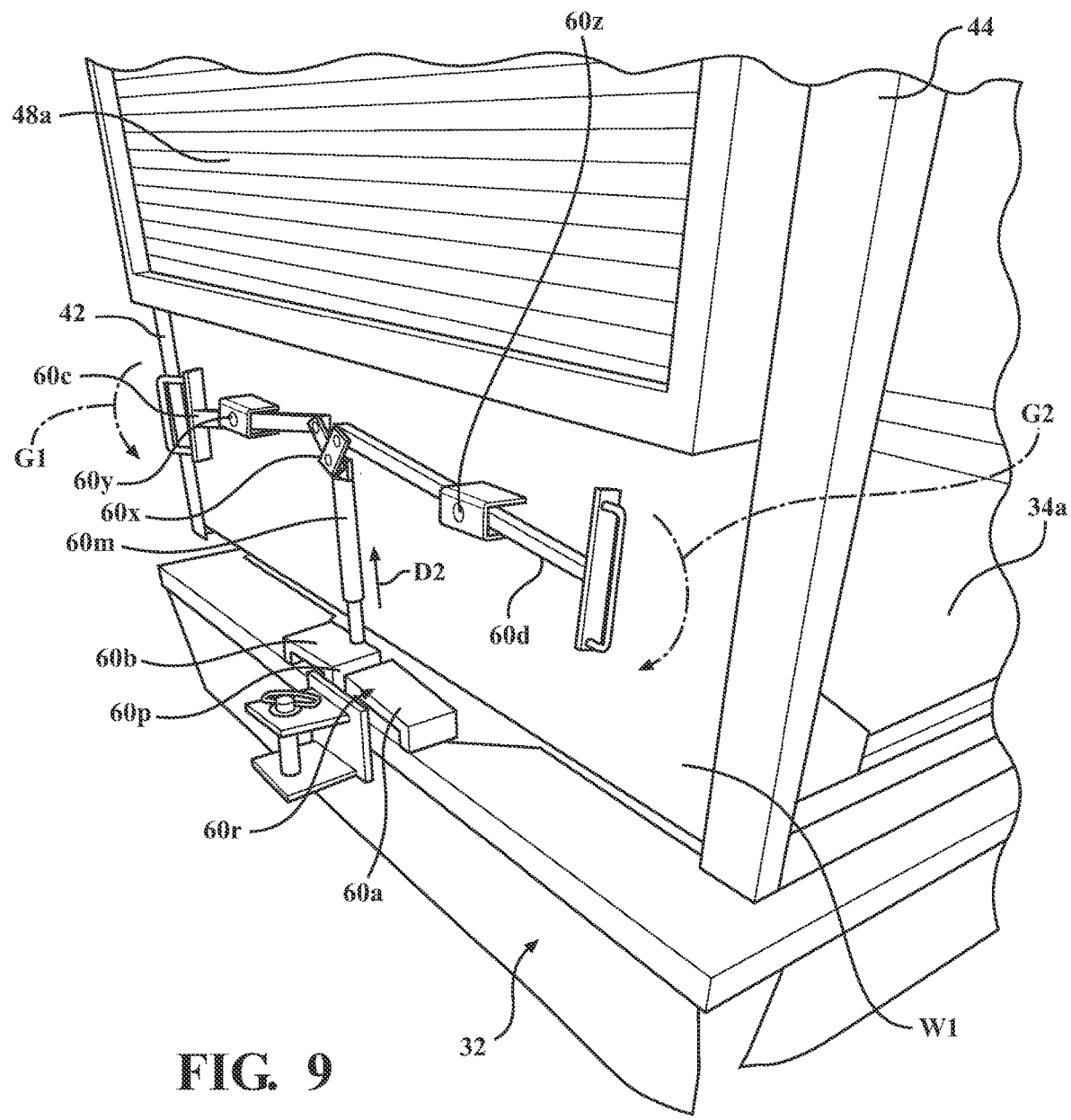
FIG. 9 is the schematic partial perspective view of FIG. 8, showing the locking mechanism configured to an unlocked condition permitting rotation of the carousel.

Referring to FIG. 8, each receptacle 60r may include an opening 60p along an upwardly-facing surface thereof. The receptacle 60r may be mounted on the base 32 so that the opening 60p is positioned along a rotational arc of the locking member 60m and is structured to receive the locking member 60m therein when the locking mechanism 60 is in a locked condition. A "rotational arc" of the locking member 60m may be a circular rotational path (or a portion of the 360° path) followed by the locking member 60m during rotation of the carousel 34 with respect to the base 32.

Referring to FIGS. 1 and 8, each receptacle 60r may also include a first ramp 60a positioned along the rotational arc of the locking member 60m and extending downwardly from the opening 60p along a first side of the opening. Each receptacle 60r may also include a second ramp 60b positioned along the rotational arc of the locking member 60m and extending downwardly from the opening 60p along a second side of the opening 60p opposite the first side.

First locking mechanism 60 may also include a first arm 60c rotatably coupled to the locking member 60m at rotatable connection or pivot 60x and rotatably connected to the first wall W1 at rotatable connection or pivot 60y so that rotation of the first arm 60c in a first rotational direction G1 (FIG. 9) moves the locking member 60m in a direction D1 away from the locking member receptacle opening 60p, and rotation of the first arm in a second rotational direction G2 opposite the first rotational direction G1 moves the locking member 60m in a direction D2 toward the locking member receptacle opening 60p.

The first locking mechanism 60 may also include a second arm 60d rotatably coupled to the locking member 60m at pivot 60x and rotatably connected to the first wall W1 at rotatable connection or pivot 60z so that rotation of the second arm 60d in the second rotational direction G2 moves the locking member 60m in a direction D2 away from the locking member receptacle opening 60p, and rotation of the second arm 60d in the first rotational direction G1 moves the locking member 60m in a direction D1 toward the locking member receptacle opening 60p.

FIGS. 1, 1A, 8, and 9 illustrate operation of the first locking mechanism 60. In operation, the first locking mechanism 60 may automatically configure to the locked condition during rotation of the carousel 34. As the carousel 34 rotates in either of rotational directions R1 and R2 toward one of the rotational orientations 0°, 90°, 180°, and 270°, the locking member 60m automatically contacts an associated one of the ramps 60a, 60b of a locking member receptacle 60r and rides up the ramp until the receptacle opening 60p is reached. When the receptacle opening 60p is reached, the locking member 60m drops in direction D1 into the receptacle opening 60p, thereby preventing further rotation of the carousel 34 until the locking member 60m is removed from the receptacle opening 60p.

To extract the locking member 60m from the opening 60p, user(s) may push one or more of arms 60c, 60d downwardly in direction D1 toward base 32, to rotate the arm(s) about their respective pivot(s). This causes the arm(s) 60c, 60d to pivot about their respective rotatable connection locations 60y, 60z which lifts the locking member 60m in direction D2 out of the receptacle opening 60p, thereby freeing the carousel 34 for rotation with respect to the base 32. In particular arrangements, the locking mechanism 60 may be structured so that a single user can extract the locking member 60m from the receptacle opening 60p by rotating on a single one of arms 60c, 60d.

Figure 5:
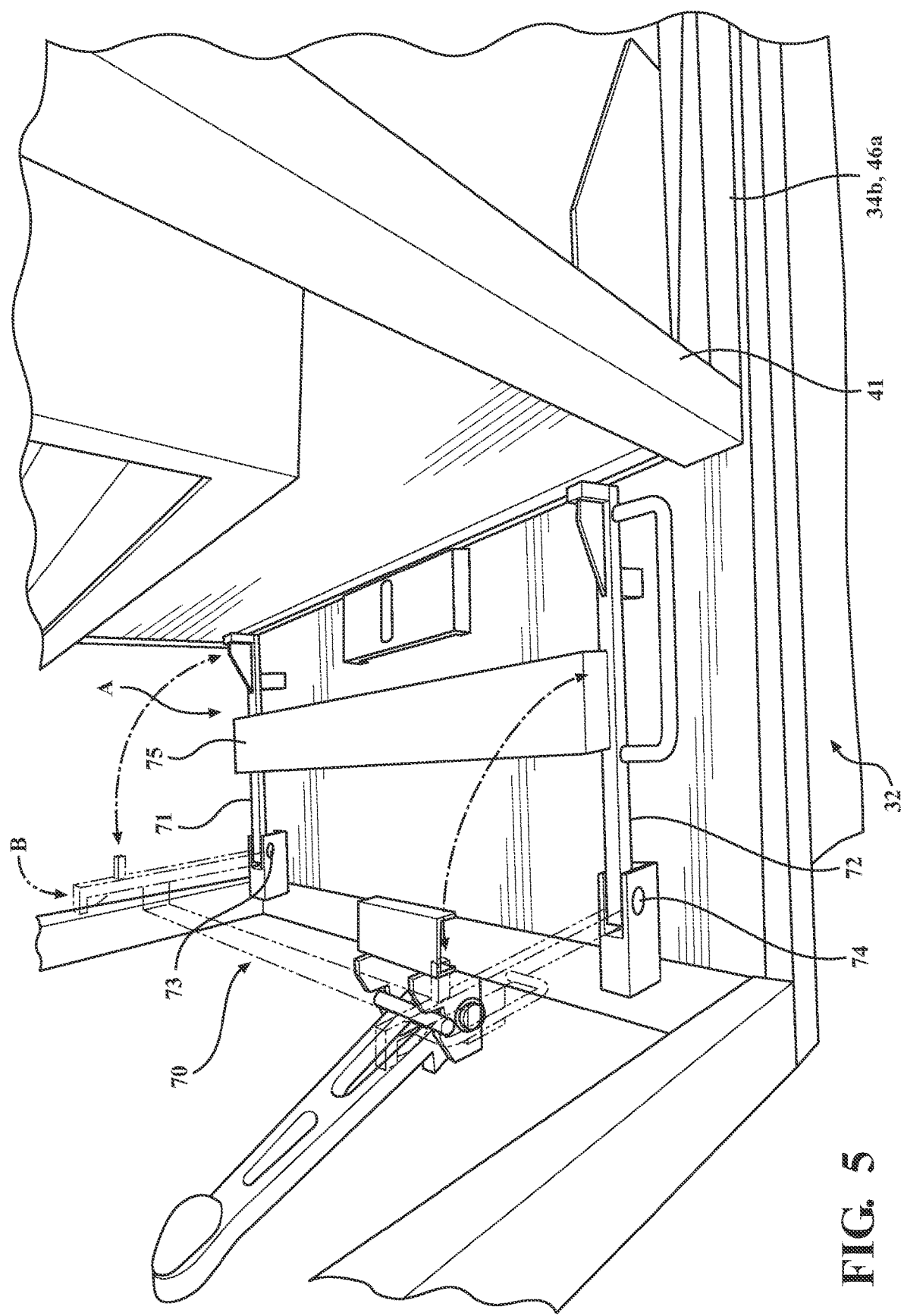
FIG. 5 is a schematic partial perspective view of an end of the dolly of FIG. 1, illustrating operation of a locking mechanism provided for preventing rotation of the dolly carousel during movement of the dolly.

Referring now to FIGS. 1A, 3, and 5, in one or more arrangements, the dolly 30 may include a second locking mechanism 70 structured serve as a backup locking mechanism during movement of the dolly 30 between locations in a plant environment. The second locking mechanism 70 may be mounted on the base 32 and may be structured to abut or contact the carousel second wall W2 during movement of the dolly 30 between locations, to prevent rotation of the carousel 34 with respect to the base 32 in case the first locking mechanism 60 fails or does not properly engage. In one or more arrangements, the second locking mechanism 70 may be positioned along the same side of the base 32 as the dolly handle 99 and its support structure.

The second locking mechanism may 70 be manually rotatable between an upright, unlocked condition and a lowered, locked condition. A "locked condition" of the second locking mechanism 70 is a condition where the mechanism has been rotated to the position "A" shown in FIGS. 3 and 5 so as to physically contact the carousel second wall W2, to prevent rotation of the carousel 34 with respect to the base 32. An "unlocked condition" of the second locking mechanism 70 is a condition where the mechanism has been rotated to the position "B" shown in FIG. 5, out of physical contact with the carousel 34, to a position or orientation that does not interfere with rotation of the carousel 34 with respect to the base 32. FIG. 5 shows the second locking mechanism 70 in the locked condition (in solid lines) and in the unlocked condition (in phantom).

In one or more arrangements, the second locking mechanism 70 may include a pair of arms 71, 72 rotatably coupled to the base by associated hinges 73, 74. Ends of the arms 71, 72 may be structured to abut second wall W2 of the carousel 34 when the second locking mechanism 70 is in the locked condition or position "A", to prevent rotation of the carousel 34. A connecting member 75 may be attached (by welds, for example) to the arms 71, 72 to operably connect the arms so that the arms 71, 72 are simultaneously rotatable to any of the locked condition and the unlocked condition of the second locking mechanism 70 by manually rotating either of the arms 71, 72.

As seen from the drawings (in particular FIG. 1A) and description, the arrangement described herein enables the first locking mechanism locking member 60m to engage automatically a receptacle 60r at intervals of 90° (along any of four sides of base 32) during rotation of the carousel 34. This enables either of the first and second sides S1, S2 of the carousel 34 (along which parts bins A1 and A2 are loaded onto (and removed from) the carousel floor 34a) to be accessed from any of the three sides of the dolly base 32 other than the side along which the second locking mechanism 70 (described below) is mounted. This arrangement provides flexibility in loading and unloading the carousel with parts bins. The arrangement also decreases the total amount of space needed to load and unload the dolly, and the amount of space needed to maneuver the dolly into a position and orientation that is usable by a worker on the assembly line. The arrangement also improves user safety, by obviating the need for a user to move to a side of the dolly residing adjacent the plant traffic flow in order access needed component parts.

In the above detailed description, reference is made to the accompanying figures, which form a part hereof. In the figures, similar symbols typically identify similar components, unless context dictates otherwise. The illustrative embodiments described in the detailed description, figures, and claims are not meant to be limiting. Other embodiments may be utilized, and other changes may be made, without departing from the scope of the subject matter presented herein. It will be readily understood that the aspects of the present disclosure, as generally described herein, and illustrated in the figures, can be arranged, substituted, combined, separated, and designed in a wide variety of different configurations, all of which are explicitly contemplated herein.

The terms "a" and "an," as used herein, are defined as one or more than one. The term "plurality," as used herein, is defined as two or more than two. The term "another," as used herein, is defined as at least a second or more. The terms "including" and/or "having," as used herein, are defined as comprising (i.e. open language). The phrase "at least one of . . . and . . . " as used herein refers to and encompasses any and all possible combinations of one or more of the associated listed items. As an example, the phrase "at least one of A, B and C" includes A only, B only, C only, or any combination thereof (e.g. AB, AC, BC or ABC).

Aspects herein can be embodied in other forms without departing from the spirit or essential attributes thereof. Accordingly, reference should be made to the following claims, rather than to the foregoing specification, as indicating the scope of the invention.

What is claimed is:

1. A dolly comprising:
    a base; and
    a carousel rotatably connected to the base,
    the carousel including a first wall and a locking mechanism, the locking mechanism including:
    a locking member;
    a locking member receptacle mounted on the base and including an opening positioned along a rotational arc of the locking member and structured to receive the locking member therein when the locking mechanism is in a locked condition;
    a first arm rotatably connected to the locking member and rotatably connected to the first wall so that rotation of the first arm in a first rotational direction moves the locking member in a direction away from the locking member receptacle opening; and
    a second arm rotatably connected to the locking member and rotatably connected to the first wall so that rotation of the second arm in a second rotational direction opposite the first rotational direction moves the locking member in a direction away from the locking member receptacle opening.

2. The dolly of claim 1, wherein the locking mechanism is structured to automatically configure to a locked condition responsive to rotation of the carousel to any of a plurality of predetermined rotational orientations, and structured to be manually configurable to an unlocked condition.

3. The dolly of claim 1, wherein the locking member receptacle includes:
    a first ramp positioned along the rotational arc of the locking member and extending downwardly from the opening along a first side of the opening; and
    a second ramp positioned along the rotational arc of the locking member and extending downwardly from the opening along a second side of the opening opposite the first side.

4. The dolly of claim 1, wherein the locking mechanism is structured to be manually rotatable between a locked condition preventing rotation of the carousel with respect to the base, and an unlocked condition enabling rotation of the carousel with respect to the base.

5. The dolly of claim 1, wherein the carousel comprises:
    a collapsible curtain assembly structured to be configurable to any of a stowed condition and a deployed condition;
    a first corner post including a notch formed therealong; and
    a second corner post spaced apart from the first corner post and including a notch formed therealong,
    each of the first corner post notch and the second corner post notch being structured to receive therein a portion of a curtain retaining member extending from the curtain assembly, to maintain the curtain assembly in the deployed condition.

6. The dolly of claim 1, wherein the carousel comprises:
    a post;
    another post spaced apart from the post;
    a wall extending between the post and the other post; and
    a collapsible curtain supported above the wall and extending between the post and the other post.

7. A dolly comprising:
    a base;
    a carousel rotatably connected to the base; and
    a locking mechanism rotatably coupled to the base and structured to be manually rotatable between a locked condition preventing rotation of the carousel with respect to the base, and an unlocked condition enabling rotation of the carousel with respect to the base,
    the locking mechanism including:
    a pair of arms rotatably coupled to the base, each arm being structured to abut a wall of the carousel when the locking mechanism is in the locked condition, to prevent rotation of the carousel; and
    a connecting member operably connecting the arms so that the arms are simultaneously rotatable to any of the locked and unlocked conditions by manually rotating either of the arms.

8. A dolly comprising:
    a base; and
    a carousel rotatably connected to the base and including a floor having a first cavity formed therein, and a first collapsible curtain assembly received in the first cavity.

* * * * *